Sept. 18, 1934.  J. F. BUHR  1,973,943
SOCKET COLLET STRUCTURE
Filed Sept. 16, 1932
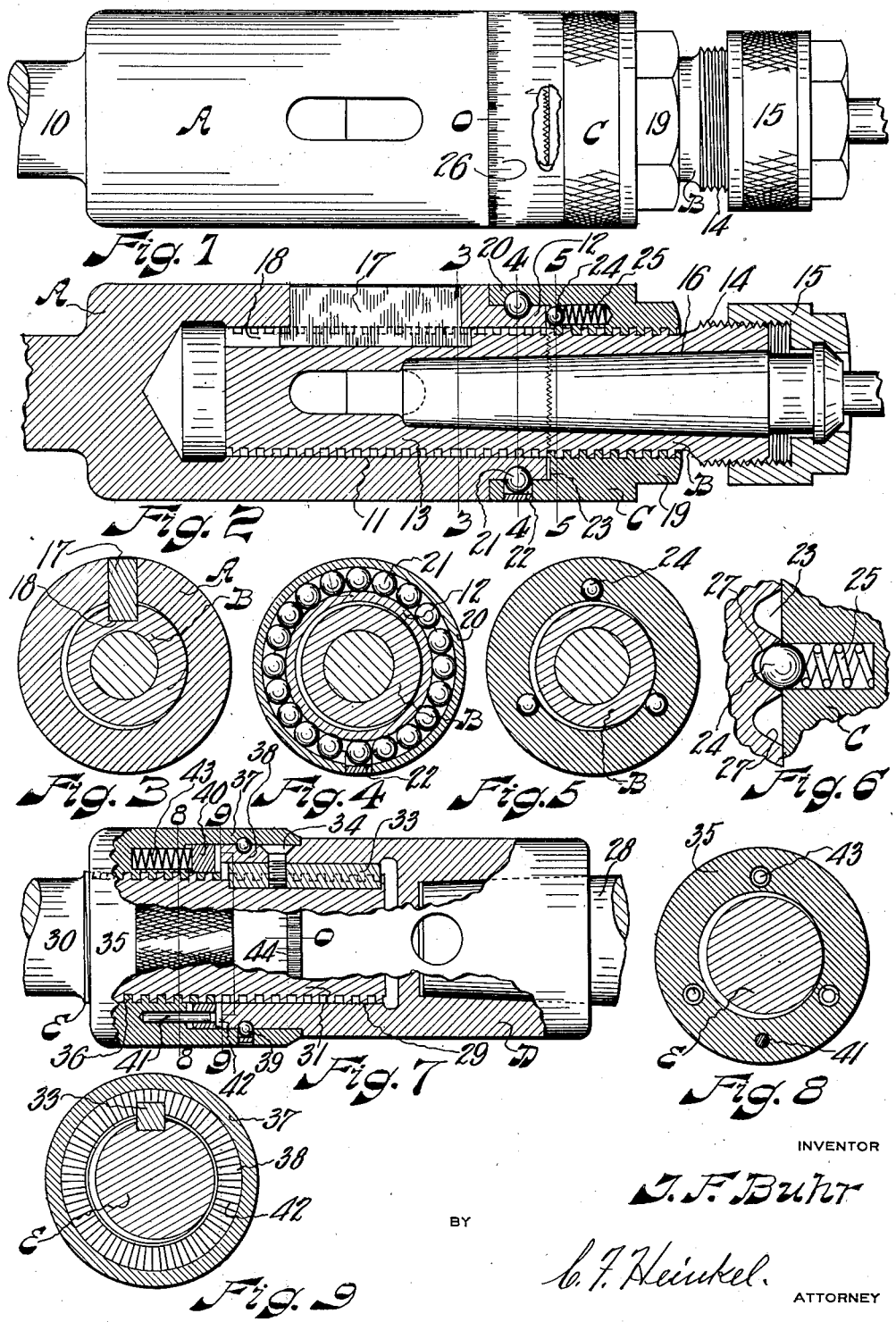
INVENTOR
J. F. Buhr
BY
C. F. Heinkel
ATTORNEY Patented Sept. 18, 1934

1,973,943

UNITED STATES PATENT OFFICE 1,973,943

SOCKET-COLLET STRUCTURE

Joseph F. Buhr, Ann Arbor, Mich.

Application September 16, 1932, Serial No. 633,408

11 Claims. (Cl. 279—9)

The present invention is partly disclosed in my Patent No. 1,845,123 and is an improvement thereon.

My invention relates to structure for holding shanks of tools and the like or means for holding such shanks.

Objects of my invention are to provide a socket-collet structure or device which is simple of design and economic of manufacture; which is adjustable for longitudinal extension thereof to adjust a shank therein longitudinally; in which the longitudinal adjustment is attained by relative rotative movement between parts of the device; in which the adjustment mentioned above is automatically locked in adjusted position and needs no releasing means for adjustment nor tightening means after adjustment; and which has a visible indicating means showing exactly how much longitudinal adjustment of the structure is being made during a rotative movement of parts of the device. Other objects will appear in this specification as the description proceeds or will become obvious or apparent or will suggest themselves upon an inspection of this specification and the accompanying drawing.

There appears to be no similar structure in the prior art. There are longitudinal adjusting means for shanks in the prior art but these require locking after adjustment and release for adjustment. Such locking and releasing throws parts of the device out of alignment but the present invention retains the alignment. The prior art uses threads for adjusting but fails to provide means on the threads to attain alignment.

I attain my objects by the mechanism illustratively shown in the accompanying drawing in which:

Fig. 1 is a side view of a socket-collet device embodying my invention, partly in section, and shows the adjusting means located near the open end of the socket.

Fig. 2 is a longitudinal section of the device shown in Fig. 1.

Fig. 3 is a transverse section on the line 3—3 of Fig. 2 showing the relations of the key to the balance of the structure.

Fig. 4 is a transverse section on the line 4—4 of Fig. 2 showing the balls holding parts of the device together.

Fig. 5 is a transverse section on the line 5—5 of Fig. 2 showing the adjustment indicating means; as related to other parts.

Fig. 6 is a fragmental sectional view showing the adjustment indicating means on a larger scale.

Fig. 7 is a side view, partly in section, showing the adjusting means located near the upper end of the socket.

Fig. 8 is a transverse section on line 8—8 of Fig. 7 showing the springs and rotation preventing pin for the locking member.

Fig. 9 is a transverse section on line 9—9 of Fig. 7 showing the teeth on the locking member.

Similar reference characters refer to similar parts throughout the views.

Describing now specifically the device shown in Figs. 1 to 6, inclusive:

The member A, herein called socket member, has the shank portion 10 of any convenient or desired form and size and also has the smooth bore 11 in one end thereof and the diametrically smaller part 12 on the same end.

The member B, herein called the collet member, has the externally threaded stem 13 extending into the bore 11 and also has the externally threaded part 14 to receive the nut 15 and also has the bore 16 to receive the shank of an implement such, for instance, as disclosed in my pending patent application, Serial No. 601,537.

It is preferred that the tops of the threads contact the wall of the bore 11, the object thereof being to prevent tilting of the stem in the bore. I prefer to use threads with flat tops, which may be square threads as shown; the object thereof being to provide as much bearing surface as possible between the top of the threads and the bore 11 to lengthen the life of the device and afford additional facility to prevent tilting of the collet member in the socket member.

The key 17 is mounted in the member A and extends into the bore 11 and there slidably engages the keyway 18 longitudinally in one end of the stem to prevent relative rotation between the member A and the stem but permit the stem to be moved longitudinally in the bore 11.

The member C has the polygonal end 19 to take hold thereof for below described adjustment purposes and also has the annular end 20 extending over the diametrically smaller part 12. The member C is internally threaded to fit the thread on the stem 13.

A row of balls 21 are inserted between the parts 20 and 12 to hold the member C longitudinally onto the member A. Each ball rides in a groove move heavily on one side wall of the part 20 and on the opposite side a groove in the part 12 than on the remaining sides. The balls are introduced into the grooves through the opening 22 until the groove is filled with balls all around whereupon the opening 22 is plugged up to keep the balls from falling out.

The end face of the part 12 has the serrations 23 therein preferably of the form shown in Fig. 6.

The adjustment indicating means shown includes the three spaced balls 24, mounted in the member C and upon the corresponding ends of the springs 25 which are also mounted in the member C. The springs normally force the balls against the angular faces of the serrations and thereby prevent relative self rotation between the member A and the member C.

The adjustment indicating marks 26 are provided on the member C and the zero mark 0 is provided on the member A. The marks 26 are spaced so that each mark represents a longitudinal relative movement or extension or contraction of the device according to a standard scale of measurement.

More or less than three balls can be used. The spacing of the balls should agree with the spacing of the marks 26 so that the springs 25 can force each of the balls into one of the serrations and effectively steady and hold the members A and C against relative self rotation.

The stem can move longitudinally in the bore 11 and the key 17 prevents relative rotation between the stem of the member B or collet member and the socket member A so that rotation of the socket member, by means of the shank 10 or otherwise, rotates the collet member and the shank of an implement therein.

Upon taking hold of the adjusting member C and rotating the same in relation to the members A and B, the threaded engagement between the stem and the member C causes the stem to move longitudinally into and out of the bore 11 according to the direction of rotation of the member C.

Normally, the action of the springs 25 contacting and forcing the balls 24 into the serrations 23, prevents relative self rotation between the members A and C and thereby retains the longitudinal adjustment of the device.

Upon relative rotation between the members A and C, the balls 24 ride on the inclined faces 27 of the serrations and are thereby forced into the member C against the springs 25 until the points of the serrations clear the balls. As soon as the points have passed the high points of the balls, the compression of the springs 25 forces the balls toward the serrations and causes the balls to ride on the inclined faces until it contacts opposite or adjacent inclined faces and rests temporarily in one of the serrations and thereby locks the member C against rotation on the member A and consequently retains the adjustment made.

The action of the balls 24 being moved and seated in the serrations can be felt plainly during the adjustment so that the amount of adjustment can be known by the sense of feeling.

However, the indicating marks 26 afford a means of positively knowing by the more positive sense of sight just how much adjustment has been made, or is being made, or whether the adjustment is changing or has been changed through any cause so that there is a positive means to show exactly where the adjustment stands. The advantage of being able to adjust the device to any degree of adjustment without any extraneous measuring instrument and knowing just how much adjustment is being made without any extraneous measurement and being able to see whether the adjustment is being maintained appears to be quite obvious.

Describing now specifically the device shown in Figs. 7, 8, and 9:

This device is structurally and functionally the same as the device of Figs. 1 to 6. The difference being that Figs. 7, 8 and 9 show the adjusting means located at the top of the socket member whereas Figs. 1 to 6 show the adjusting means at the bottom of the socket member.

The member D, herein called the socket member, has the socket in one end thereof to receive the shank 28 and the bore 29 is smooth so that the below described receiving member can slide longitudinally therein.

The receiving member E has the shank 30 of any convenient form or size on one end thereof and also has the externally threaded part 31 on the other end thereof. The threads 32 are shown as square threads to provide as much bearing surface as possible on the tops thereof on the bore 29. The key 33 is mounted in the member D by means of the screw 34 and extends into a corresponding keyway cut across the threads in the end 31 to prevent relative rotation but permit of longitudinal movement between the members 31 and D.

The adjusting member 35 has the internal threads 36 fitting to the external threads 32 and also has the annular part 37 overlapping the diametrically smaller part 38 on the end of the member D.

The balls 39 are introduced between the parts 37 and 38 similar to the balls 21 to hold the members D and 35 together longitudinally while permitting relative rotation between them.

In this structure, the annular member 40 is introduced, in place of the balls of Figs. 1 to 6.

The member 40 is located between the parts 31 and 37 and can move or slide longitudinally on the pin 41 which is fixed in the member 35 and which pin also prevents relative rotation between the members 35 and 40. More than the one pin 41 shown can be used.

The teeth 42 are provided on one side face of the member 40 and are adapted to engage corresponding teeth on the end of the member D.

The springs 43 are mounted in the member 35 and exert their pressure against the other side of the member 40 to normally force the teeth on the members 40 and D into engagement to hold the adjustment between them.

Upon relative rotation between the members 35 and D, the sides of the teeth on the members 40 and D ride on each other and force the member 40 upwardly against the action of the spring until the teeth clear each other for further relative rotation between the members 40 and D.

Each time the teeth on one of the members comes opposite a groove in the other member, the springs 43 force the teeth into the grooves and the adjustment can be felt so that it can be known just how many notches or teeth have been passed or how much adjustment is being made or has been made.

The graduation or adjustment indicating marks 44 are provided on the member 35 and a corresponding zero mark 0 is provided on the member D and afford a means to actually see just how much adjustment is being made or has been made.

The marks 44 are so spaced in relation to the pitch of the thread on the part 31 and the number of teeth on the members 40 and D that each is equivalent to a longitudinal movement of the member D in relation to the member E measured on a recognized standard scale.

For driving shanks of smaller tools or of tools which do not require much power, the keys 17 and 33 may be omitted and the springs are usually strong enough to keep the teeth in engagement for driving. The springs can also be made stronger than necessary for adjusting, or a larger number of springs can be used to hold the teeth in engagement to drive without the keys 17 or 33. This structure renders the adjusting a little harder but the polygonal parts afford an easy means for adjustment without much difficulty on that score.

The present invention provides an improvement over the prior art in that a less number of parts are required to attain at least the same function as heretofore and the locking and unlocking is attained automatically as required during the adjusting movements so that no separate operations are required for locking and unlocking and the parts will not be thrown out of alignment by the locking and unlocking.

I am aware that changes and modifications can be made in the structure and arrangement of parts, shown and described, one modification being shown in Figs. 7, 8 and 9 for illustration, within the spirit and intent of my invention and the appended claims; therefore, without limiting myself to the precise structure and arrangement of parts as shown and described.

I claim:

1. A socket-collet structure including a socket member having a bore, a member having a stem slidable longitudinally in said bore, an adjusting member longitudinally fixed but rotatable on the open end of said socket member and engaging said stem to slide the same longitudinally in said bore, serrations on the open end of said socket member, a locking member unrotatable in said adjusting member and having serrations on a side thereof opposite the first mentioned serrations, and a spring normally forcing the serration on said locking member into the serrations on said socket member for locking said adjusting member against rotation on said collet member and adapted to permit said serrations to separate during adjusting movement of said adjusting member.

2. In a tool means of the character described, the combination of telescoping socket and collet members relatively unrotatable and relatively adjustable longitudinally to adjustably vary the telescopic relation thereof, an adjusting member engaging said socket and collet members and being individually rotatable to adjustably vary said telescopic relation, and a row of balls between said socket and said adjusting members, each of said balls in contact with said socket and said adjusting members to retain said adjusting member against said socket member and thereby also retain said socket and collet members in adjusted longitudinal relation.

3. In a tool means of the character described, the combination of telescoping socket and collet members relatively unrotatable and relatively adjustable longitudinally to adjustably vary the telescopic relation thereof, a threaded stem on said collet member, a self locking automatically releasing adjusting member threaded to said stem and rotatable relative to said socket and collet members and telescoping over a portion of said socket member, and a row of balls engaging said adjusting member and said socket member to permanently hold said adjusting member against said socket member and thereby also hold said socket and collet members in endwise unmovable longitudinally adjusted relation.

4. In a tool means of the character described, the combination of telescoping socket and collet members relatively unrotatable and relatively adjustable longitudinally to adjustably vary the telescopic relation thereof, a threaded stem on said collet member, a self locking automatically releasing adjusting member threaded to said stem and rotatable relative to said socket and collet members and telescoping over a portion of said socket member, a row of balls engaging said adjusting member and said socket member to permanently hold said adjusting member against said socket member and thereby also hold said socket and collet members in endwise unmovable longitudinally adjusted relation, and visible indicating marks on said adjusting member and spaced to indicate the amount of adjustment made and being made according to a recognized standard scale.

5. In a tool means of the character described, the combination of telescoping socket and collet members relatively unrotatable and relatively adjustable longitudinally to adjustably vary the telescopic relation thereof, serrations on an end of said socket member a threaded stem on said collet member, a self locking automatically releasing adjusting member threaded to said stem and rotatable relative to said socket and collet members and telescoping over a portion of said socket member, a row of balls engaging said adjusting member and said socket member to permanently hold said adjusting member against said socket member and thereby also hold said socket and collet members in endwise unmovable longitudinally adjusted relation, three spaced apart locking balls mounted in said adjusting member to engage and disengage said serrations for locking and unlocking said adjusting member, and a spring for each of said balls normally tending to move said balls into said serrations.

6. A device of the character described comprising in combination a telescoping socket having a uniform bore, a tool receiving collet member fitting therein and being non-rotatable and relatively adjustable longitudinally to adjustably vary the telescopic relation thereof, an adjusting sleeve telescoping over a portion of said socket member, means connecting said sleeve and said tool receiving collet member for axial movement of said tool receiving collet member upon rotation of said sleeve, and means to maintain said sleeve and said socket member against relative axial movement.

7. A device of the character described comprising in combination, telescoping socket and tool receiving collet members relatively unrotatable and relatively adjustable longitudinally to adjustably vary the telescopic relation thereof, an adjusting sleeve telescoping over a portion of said socket member, means connecting said sleeve and said tool receiving collet member for axial movement of said tool receiving collet member upon rotation of said sleeve, and means rigidly to maintain said sleeve and said socket member against axial movement.

8. A device of the character described comprising in combination, telescoping socket and tool receiving collet members relatively unrotatable and relatively adjustable longitudinally to adjustably vary the telescopic relation thereof, an adjusting sleeve engaging said socket and tool receiving collet members and being individually rotatable to adjustably vary said telescopic relation, a groove in the outer circumferential surface of said socket member, an opposed groove located in the inner circumferential surface of said sleeve and a row of balls in said grooves to maintain said sleeve and said socket member against relative axial movement.

9. A device of the character described comprising in combination, telescoping socket and tool receiving collet members relatively unrotatable and relatively adjustable longitudinally to adjustably vary the telescopic relation thereof, a threaded stem on said tool receiving collet member, an adjusting sleeve threaded to said stem, rotatable relatively to said socket and tool receiving collet member and telescoping over a portion of said socket member, and means rigidly to maintain said sleeve and said socket against relative axial movement.

10. A device of the character described comprising in combination, telescoping socket and tool receiving collet members relatively unrotatable and relatively adjustable longitudinally to adjustably vary the telescopic relation thereof, a threaded stem on said tool receiving collet member, an adjusting sleeve threaded to said stem, rotatable relatively to said socket and tool receiving collet members and telescoping over a portion of said socket member, a row of balls engaging said adjusting sleeve and said socket member to maintain said tool receiving collet and said socket against relative axial movement, serrations on an end of said socket member and means for engagement and disengagement with said serrations for releasably maintaining said adjusting sleeve in adjusted position.

11. A device of the character described comprising in combination, telescoping socket and tool receiving collet members relatively unrotatable and relatively adjustable longitudinally to adjustably vary the telescopic relation thereof, a threaded stem on said tool receiving collet member, an adjusting sleeve threaded to said stem, rotatable relatively to said socket and tool receiving collet member and telescoping over a portion of said socket member, a row of balls disposed between the telescoped portion of said tool receiving collet member and said socket member to maintain the same against relative axial movement, serrations on an end of said socket member, means for engagement and disengagement with said serrations for releasably maintaining said adjusting sleeve in adjusted position and visible indicating graduations on said adjusting sleeve spaced to indicate the adjustment made.

JOSEPH F. BUHR.